No. 732,178. Patented June 30, 1903.

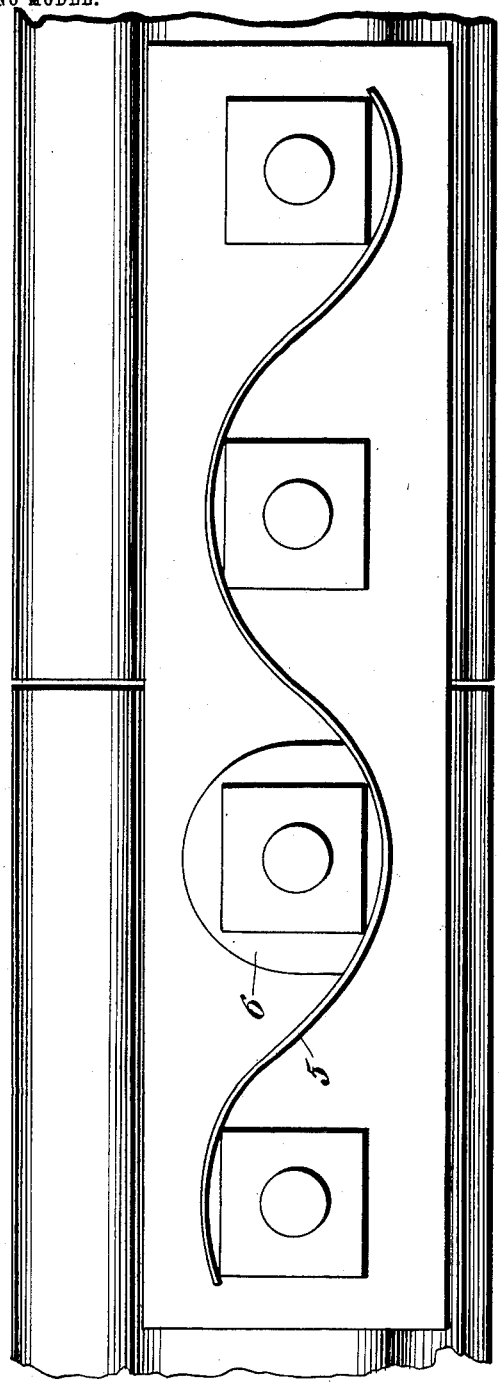
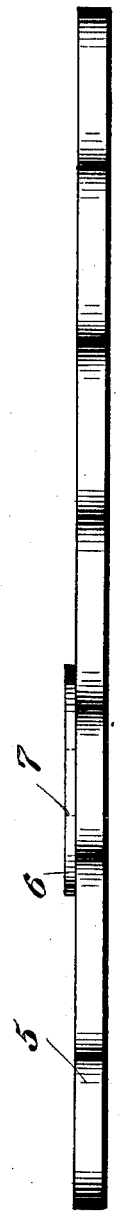

UNITED STATES PATENT OFFICE.

LAWRENCE ESSER, OF PILOTGROVE, MISSOURI.

NUT-LOCK.

SPECIFICATION forming part of Letters Patent No. 732,178, dated June 30, 1903.

Application filed November 21, 1902. Serial No. 132,232. (No model.)

*To all whom it may concern:*

Be it known that I, LAWRENCE ESSER, a citizen of the United States, residing at Pilotgrove, in the county of Cooper and State of Missouri, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in nut-locks, and has for its object a simple and efficient device for securely locking a nut against displacement.

A further object is to provide a nut-lock which may be used without altering or changing in any manner the construction of the nut or bolt.

My invention is to be used in connection with a structure having more than one nut in close proximity to each other and is especially adapted for the fish-plates of rail-joints.

In the accompanying drawings, Figure 1 is a top plan view of my invention. Fig. 2 is a side elevation showing its application in connection with a rail-joint.

Referring specifically to the drawings, 5 indicates a flat strip of metal, preferably spring-steel, which is bent or bowed so as to lie over the upper and lower sides, respectively, of two adjoining nuts. By lengthening the strip it may be used to hold three or more nuts. In Fig. 2 I have shown it applied to four nuts. The strip 5 is provided with a projecting washer-plate 6 at the inner edge thereof, which has a hole 7. The plate 6 is placed under one of the nuts, the bolt passing through the hole 7. This prevents lateral displacement of the strip, rotation of the nut being prevented by the engagement of the strip itself with the sides of the nut. By reason of the flexibility and elasticity of the strip it is not necessary to remove it if it is desired to tighten up a nut, and the nut may be turned with the strip in position. In the drawings I have shown square nuts; but hexagonal nuts may be used as well.

Having thus described my invention, what is claimed as new, and desired to be secured by Letters Patent, is—

A nut-lock comprising a flexible strip adapted to lie over the upper and lower sides respectively, of adjoining nuts, and a perforated washer-plate integral therewith extending from the inner edge thereof, said strip lying on each side of said washer substantially as described.

In testimony whereof I affix my signature in presence of two witnesses.

LAWRENCE ESSER.

Witnesses:
STEVE L. STITES,
F. K. HARRIS.